(12) United States Patent
Kadota

(10) Patent No.: US 11,900,839 B2
(45) Date of Patent: Feb. 13, 2024

(54) DISPLAY CONTROL METHOD, DISPLAY CONTROL DEVICE, AND DISPLAY SYSTEM

(71) Applicant: SEIKO EPSON CORPORATION, Tokyo (JP)

(72) Inventor: Kentaro Kadota, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/389,423

(22) Filed: Jul. 30, 2021

(65) Prior Publication Data

US 2022/0036778 A1    Feb. 3, 2022

(30) Foreign Application Priority Data

Jul. 30, 2020 (JP) ................. 2020-129065

(51) Int. Cl.

| | |
|---|---|
| G09G 3/00 | (2006.01) |
| G09G 5/02 | (2006.01) |
| G09G 5/06 | (2006.01) |
| G09G 3/36 | (2006.01) |
| G06T 7/90 | (2017.01) |
| H04N 1/60 | (2006.01) |
| H04N 5/202 | (2023.01) |
| H04N 17/02 | (2006.01) |
| H04N 9/77 | (2006.01) |
| H04N 9/44 | (2006.01) |
| H04N 9/64 | (2023.01) |
| H04N 9/69 | (2023.01) |
| H04N 5/57 | (2006.01) |

(52) U.S. Cl.
CPC ............... *G09G 3/001* (2013.01); *G06T 7/90* (2017.01); *G09G 3/3607* (2013.01); *G09G 2320/0247* (2013.01); *G09G 2320/0666* (2013.01); *G09G 2320/0693* (2013.01)

(58) Field of Classification Search
CPC .......... G06T 7/90; G06T 11/001; G06T 7/60; G09G 5/02; G09G 5/06; G09G 3/3607; G09G 2320/0247; G09G 2320/0666; G09G 3/20; G09G 2320/0233; G09G 2320/0693; G09G 2360/145; H04N 1/56; H04N 1/60; H04N 1/6055; H04N 5/232; H04N 5/57; H04N 1/6002; H04N 1/6027; H04N 1/6033; H04N 1/6041; H04N 1/6058; H04N 5/202; H04N 5/21; H04N 9/64; H04N 9/69; H04N 9/77–79; H04N 17/02; G06F 3/048
See application file for complete search history.

(56) References Cited

U.S. PATENT DOCUMENTS 9,594,977 B2 * 3/2017 Lin .................. G06T 7/90
9,654,750 B2 * 5/2017 Kunieda .......... H04N 9/3191
(Continued)

FOREIGN PATENT DOCUMENTS

JP     2005-151418 A    6/2005

*Primary Examiner* — Wesner Sajous
(74) *Attorney, Agent, or Firm* — Dority & Manning, P.A.

(57) ABSTRACT

A first content image and a second content image is acquired, a first content image has first color information, a first pattern image having a first color scheme is determined based on the first color information, the first content image is displayed on a screen, the first pattern image is displayed on the screen after displaying the first content image, and the second content image is displayed on the screen after displaying the first pattern image.

8 Claims, 8 Drawing Sheets

(56) References Cited

U.S. PATENT DOCUMENTS

| | | | |
|---|---|---|---|
| 2011/0051206 A1* | 3/2011 | Sitter | H04N 1/6094 |
| | | | 358/518 |
| 2013/0147860 A1* | 6/2013 | Ishida | G09G 5/10 |
| | | | 345/690 |
| 2014/0232880 A1* | 8/2014 | Murase | H04N 17/02 |
| | | | 348/189 |
| 2016/0364625 A1 | 12/2016 | Lin et al. | |
| 2020/0051525 A1* | 2/2020 | Mikami | H04N 1/6055 |

* cited by examiner

DISPLAY CONTROL METHOD, DISPLAY CONTROL DEVICE, AND DISPLAY SYSTEM

The present application is based on, and claims priority from JP Application Serial Number 2020-129065, filed Jul. 30, 2020, the disclosure of which is hereby incorporated by reference herein is its entirety.

BACKGROUND

1. Technical Field

The present disclosure relates to a display control method, a display control device, and a display system.

2. Related Art

JP-A-2005-151418 discloses a projector that forms a solid black image and a test pattern at different times within a display period of a picture based on a picture signal and calculates a difference between the solid black image and the test pattern detected by detecting means.

However, according to the method disclosed in JP-A-2005-151418, the difference between the picture and the test pattern projected on a screen may be sensed by a user as flickering of the picture depending on the projected images.

SUMMARY

An aspect of the present disclosure is directed to a display control method including acquiring a first content image and a second content image, determining a first pattern image having a first color scheme based on first color information, displaying the first content image on a screen, displaying the first pattern image on the screen after the displaying the first content image, and displaying the second content image on the screen after the displaying the first pattern image, wherein the first content image has the first color information.

Another aspect of the present disclosure is directed to a display control device that controls a display device displaying an image on a screen, including one or more processors programmed to acquire a first content image and a second content image, determine a first pattern image having a first color scheme based on first color information, and control the display device to display the first content image on the screen, display the first pattern image on the screen after displaying the first content image, and display, the second content image on the screen after displaying the first pattern image, wherein the first content image has the first color information.

Another aspect of the present disclosure is directed to a display system including a display device that displays an image on a screen, and a display control device includes one or more processors programmed to acquire a first content image and a second content image, determine a first pattern image having a first color scheme based on first color information, and control the display device to display the first content image on the screen, display the first pattern image on the screen after displaying the first content image, and display the second content image on the screen after displaying the first pattern image.

DESCRIPTION OF EXEMPLARY EMBODIMENTS

Figure 1:
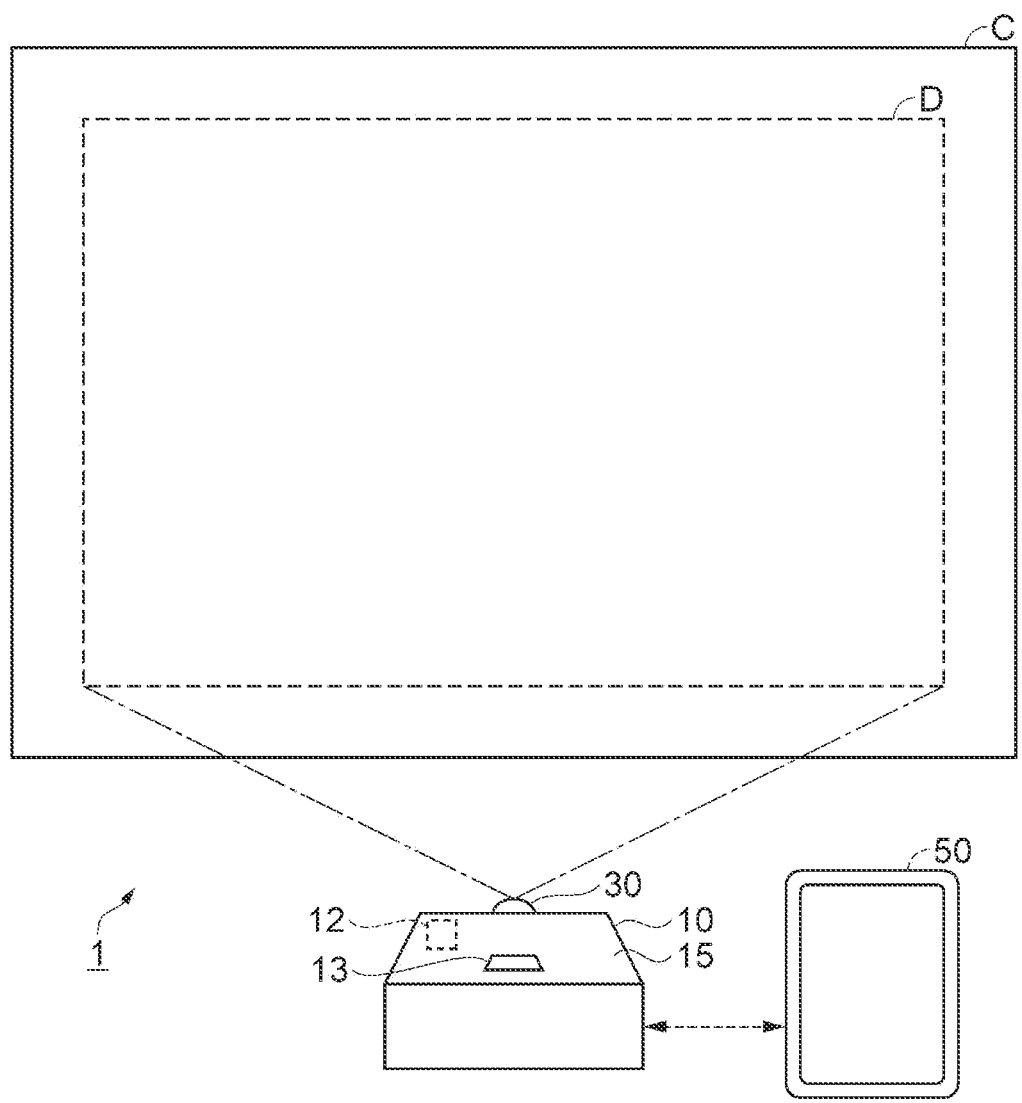
FIG. 1 is a perspective view for explanation of a display system according to an embodiment.

As below, embodiments of the present disclosure will be explained with reference to the drawings. The embodiments exemplify an apparatus and a method for implementing the technical idea of the present disclosure. In the drawings, the same or similar elements respectively have the same or similar signs, and the overlapping description will be omitted. Various changes may be made to the technical idea of the present disclosure within the technical scope described in the appended claims.

As shown in FIG. 1, a display system 1 according to the embodiment is formed as a display apparatus 10 that displays an image D on a screen C. The display system 1 may include a reproducing apparatus 50 that reproduces a content. The reproducing apparatus 50 may be housed within a housing 15 of the display apparatus 10 and formed as a part of the display apparatus 10. In the embodiment, the display apparatus 10 will be illustratively explained as a projector that displays the image D by projection of light on the screen C including a roll screen or white board. The display apparatus 10 may be another display apparatus such as a flat-panel display.

The reproducing apparatus 50 outputs the reproduced content to the display apparatus 10. The content is multimedia data containing a plurality of time-series content images. The reproducing apparatus 50 is an arbitrary apparatus having a function of outputting the content to the display apparatus 10 including e.g. a personal computer, a tablet terminal, a smartphone, a digital media player, a camera, a movie player, a wireless display adapter, a television tuner, and a videogame machine.

Figure 2:
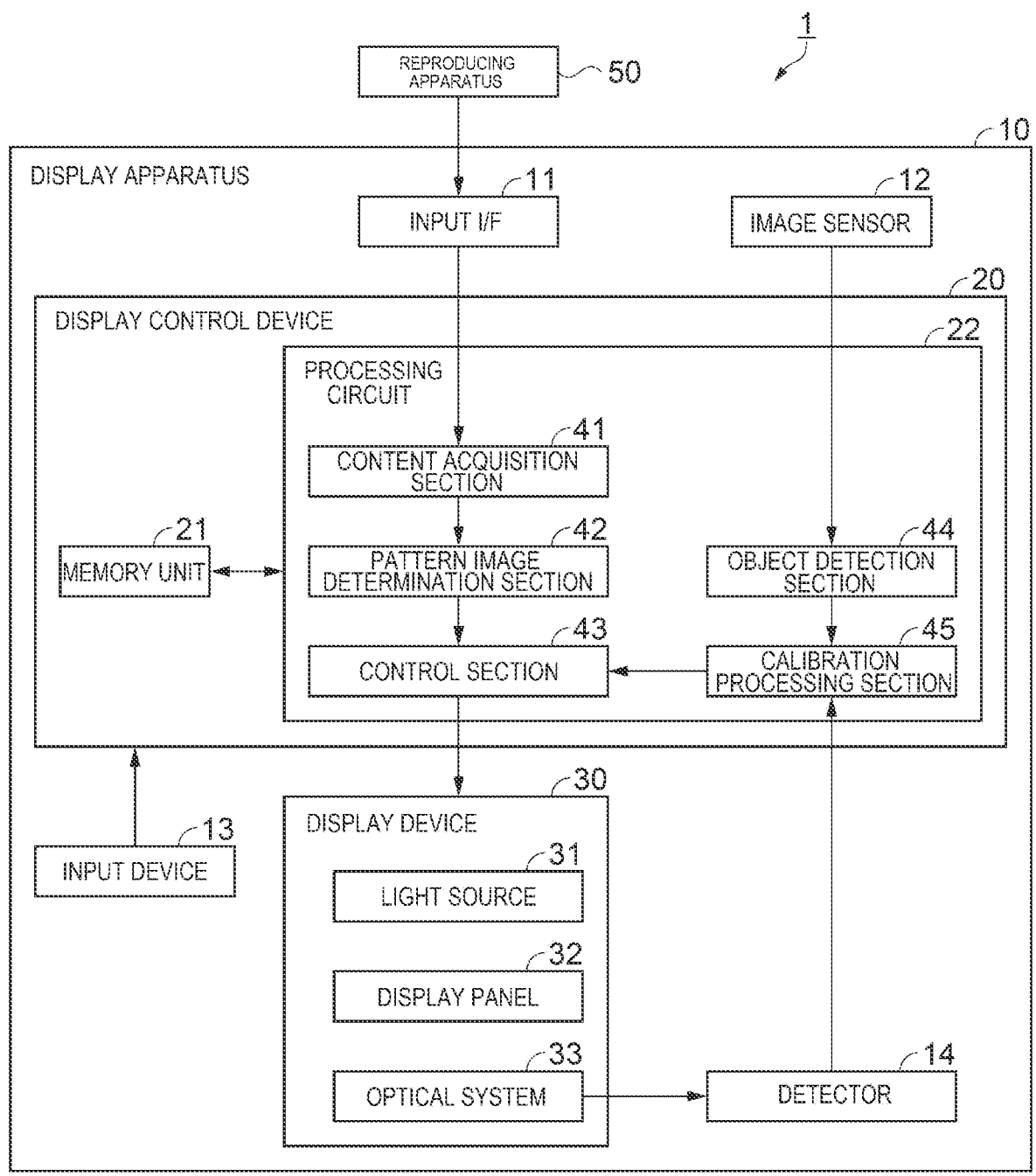
FIG. 2 is a block diagram for explanation of the display system according to the embodiment.

As shown in FIG. 2, the display apparatus 10 includes e.g. an input interface (I/F) 11, an image sensor 12, an input device 13, a detector 14, a display control device 20, and a display device 30. The input I/F 11 sequentially inputs signals representing contents reproduced by the reproducing apparatus 50 from the reproducing apparatus 50 and outputs the signals to the display control device 20. The input I/F 11 may include e.g. an antenna transmitting and receiving radio signals, a connector coupled to a communication cable, and a communication circuit processing the signals transmitted in a communication link.

The display device 30 includes e.g. a light source 31, a display panel 32, and an optical system 33. The light source 31 includes e.g. a discharge lamp and a light emitting device such as a solid-state light source. The display panel 32 is a light modulation device having a plurality of pixels. The display panel 32 modulates light emitted from the light source 31 according to an image signal output from the display control device 20. The display panel 32 is e.g. a transmissive or reflective liquid crystal light valve. The display panel 32 may be a digital micromirror device that controls reflection of light with respect to each pixel. The optical system 33 displays the content image contained in the content reproduced by the reproducing apparatus 50 as the image D by projecting the light sequentially modulated by the display panel 32 onto the screen C. The optical system 33 may include various lenses, mirrors, and drive mechanisms.

The image sensor 12 images the image C displayed by the display device 30 and generates a detection image. The image sensor 12 includes a solid-state imaging device. The position and the alignment of the image sensor 12 in the housing 15 are adjusted in advance to contain the maximum projection range by the display device 30. The image sensor 12 may be placed outside of the housing 15.

The input device 13 receives operation by a user and outputs a signal according to the operation by the user to the display control device 20. As the input device 13, various input devices including e.g. a switch such as a push button, a touch sensor, or a keyboard and a pointing device such as a mouse, a touch panel, a digitizer, or a ranging sensor can be employed.

The detector 14 detects at least one of a shift amount, a focal distance, and a projection range of the projection lens of the optical system 33 as settings of the optical system 33. The detector 14 may be formed using e.g. a variable resistance. The shift amount, the focal distance, and the projection range may be detected using another detector such as an encoder or detected based on a drive signal of the display control device 20 for driving the optical system 33.

The display control device 20 includes a memory unit 21 and a processing circuit 22. The display control device 20 controls the display device 30 to display various images D including the content images contained in the contents input to the input I/F 11 on the screen C according to the operation by the user on the input device 13. The display control device 20 calibrates the image D displayed on the screen C using the detection image generated by the image sensor 12.

The memory unit 21 is a computer-readable memory medium that stores a control program and various data representing a series of processing necessary for the operation of the display apparatus 10. As the memory unit 21, e.g. a semiconductor memory can be employed. The memory unit 21 is not limited to a nonvolatile auxiliary storage device, but may include a volatile main storage device such as a register or cash memory. At least a part of the memory unit 21 may be formed using a part of the processing circuit 22. The memory unit 21 may be formed using integrated hardware or a plurality of separate pieces of hardware.

The processing circuit 22 includes a processing unit of a computer that processes calculations necessary for the operation of the display apparatus 10. The processing circuit realizes the respective functions described in the embodiment by executing e.g. the control program stored in the memory unit 21. As a processing unit forming at least a part of the processing circuit 22, various logical operation circuits including a central processing unit (CPU), a digital signal processor (DSP), a programmable logic device (PLD), and application specific integrated circuits (ASIC) can be employed. The processing circuit 22 may be formed using integrated hardware or a plurality of separate pieces of hardware.

The processing circuit 22 has a content acquisition section 41, a pattern image determination section 42, a control section 43, an object detection section 44, and a calibration processing section 45 as logical structures. The content acquisition section 41 acquires contents to be reproduced by the reproducing apparatus 50 via the input I/F 11. For example, the content acquisition section 41 acquires a content containing a first content image P1 and a second content image P2 after the first content image P1 in the time series of the content. The content acquisition section 41 acquires data of time-series content images by sequentially decoding the content and sequentially outputs the data to the pattern image determination section 42 and the control section 43.

Figure 3:
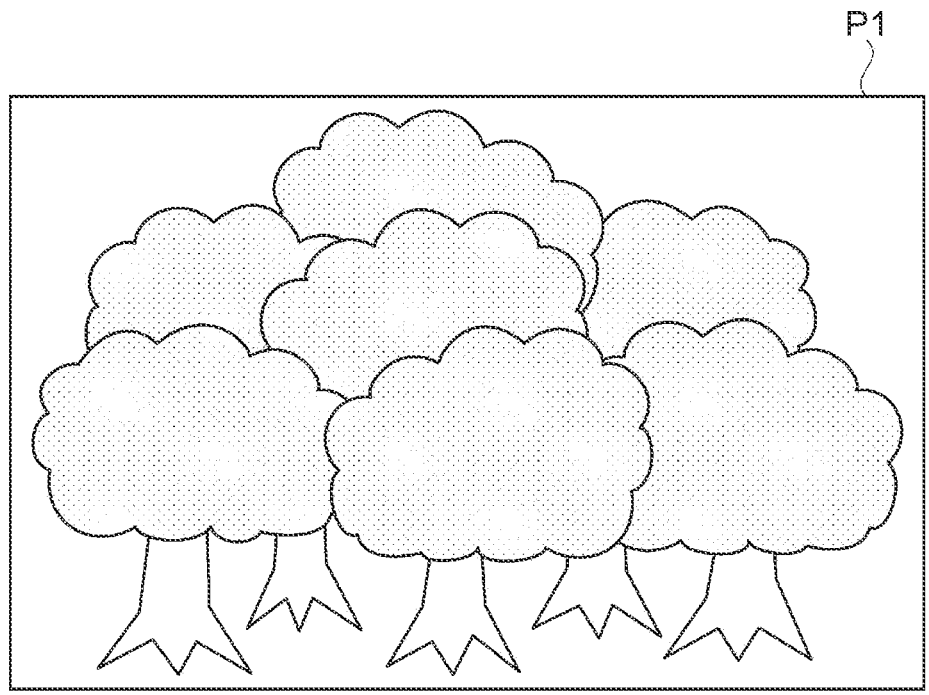
FIG. 3 is a diagram for explanation of an example of a first content image.

As shown in FIG. 3, the first content image P1 has first color information representing e.g. green as a basic color. The pattern image determination section. 42 acquires the first color information by analyzing the first content image P1. The color information is information on a color of the content image. The color information may include at least one of e.g. a color value as coordinates in a predetermined color space or a range thereof, and a color scheme. As the color value, coordinates of an arbitrary channel selected from a plurality of channels in the color space may be employed.

Figure 4:
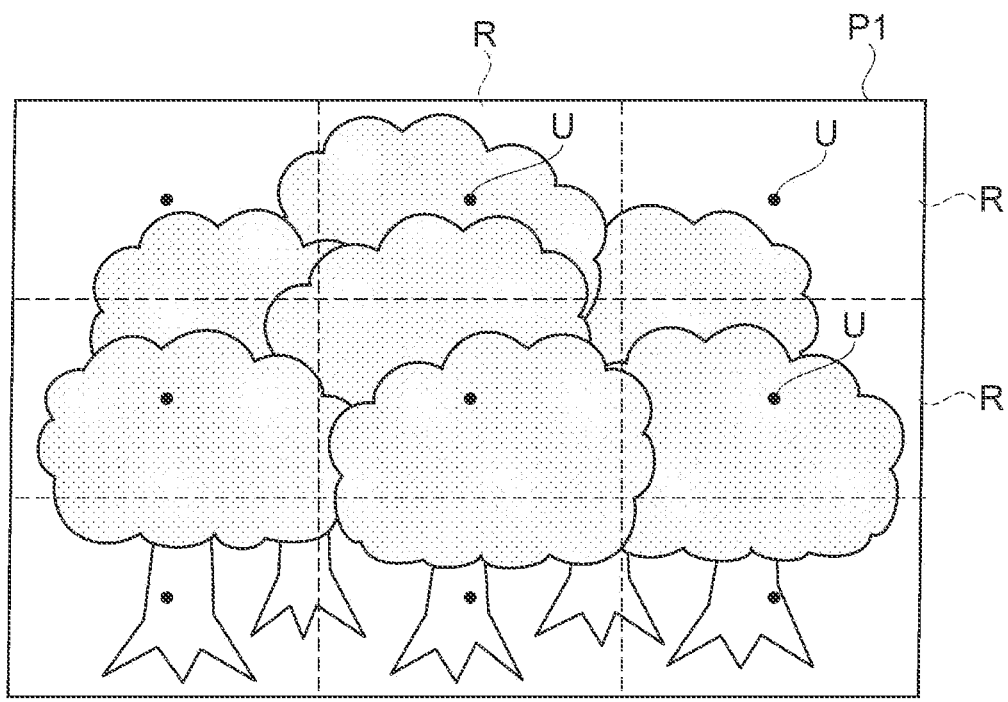
FIG. 4 is a diagram for explanation of an example of a method of acquiring first color information.

As shown in FIG. 4, the pattern image determination section 42 acquires the first color information from e.g. the respective colors of selected pixels as a plurality of pixels selected from the first content image P1. The selected pixels are e.g. pixels located at respective centers U of an area R obtained by division of the first content image P1 in a matrix form of 3×3. The pattern image determination section 42 calculates e.g. representative values of the respective colors of the selected pixels of the content image and acquires the values as color information. As the representative values, various values such as averages, medians, or modes may be employed. As the method of acquiring the color information, other various methods can be employed.

Figure 5:
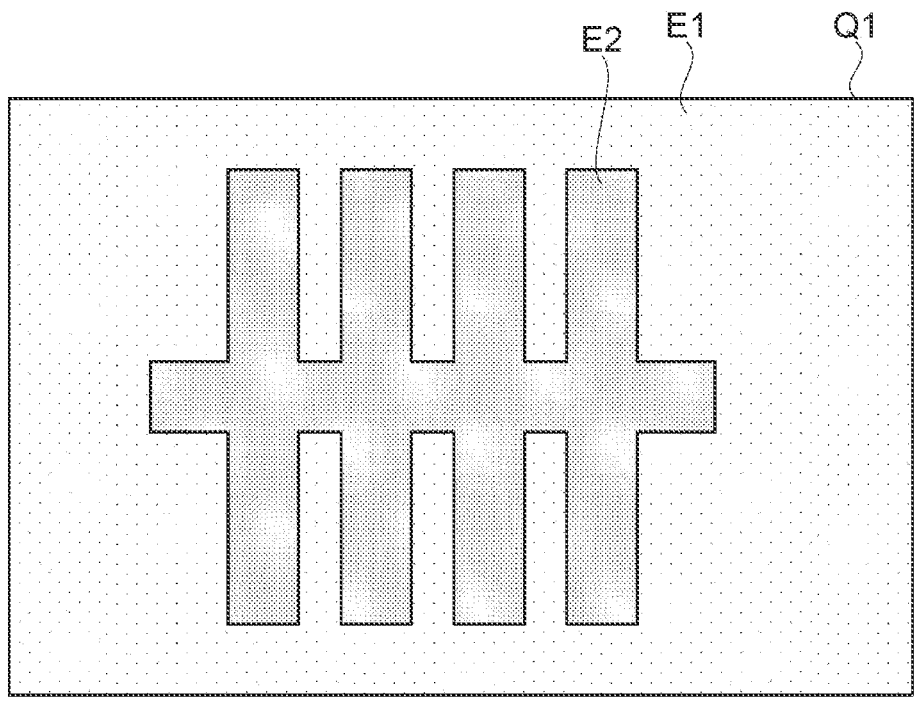
FIG. 5 is a diagram for explanation of an example of a first pattern image.
Figure 6:
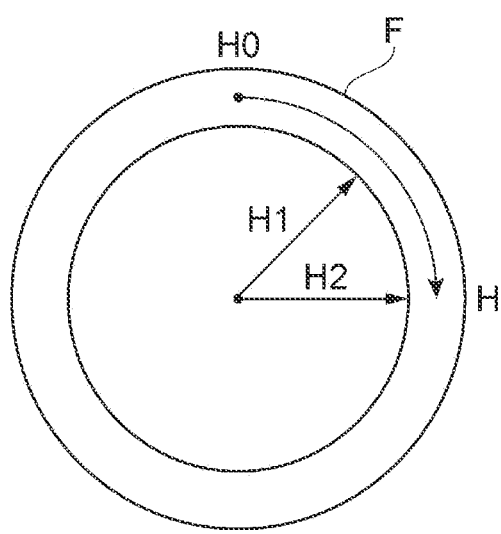
FIG. 6 is a diagram for explanation of an example of a method of determining a first color scheme of the first pattern image.

As shown in FIG. 5, the pattern image determination section 42 determines a first pattern image Q1 having a first color scheme based on the first color information of the first content image P1. The first color scheme is a color scheme determined from the first color information. For example, the first pattern image Q1 contains a first color E1 as a background color and a second color E2 having a predetermined pattern. At least one of the first color E1 and the second color P2 is a coil or in the same series as the color: represented by the first color information. For example, the same series means that a distance between two colors in a color space is less than a threshold. For example, as shown in FIG. 6, in a color space F represented by a hue H circulating clockwise with reference to a hue H0, when the color represented by the first color information and the second color E2 are located in a threshold range from, a hue H1 to a hue H2, the two colors are in the same series.

The memory unit 21 stores e.g. data of a plurality of pattern images containing the first pattern image Q1. The respective pattern images have different color schemes from one another. The pattern image determination section 42 selects the first pattern image Q1 from the plurality of pattern images stored in the memory unit 21 based on the first color information. That is, the pattern image determination section 42 selects the pattern image having the first color scheme closest to the first content image 21 from the data of the plurality of pattern images stored in the memory unit 21 and determines the pattern image as the first pattern image Q1. The memory unit 21 stores the plurality of pattern images in advance, and thereby, the processing load in the processing circuit 22 for generation of the pattern images may be reduced.

The control section 43 controls the display device 30 to selectively display the content image input from the content acquisition section 41 or the pattern image determined by the pattern image determination section 42 as the image D on the screen C. Specifically, the control section 43 generates image signals by rendering the data of the content image or the pattern image and sequentially outputs the image signals to the display device 30.

Figure 7:
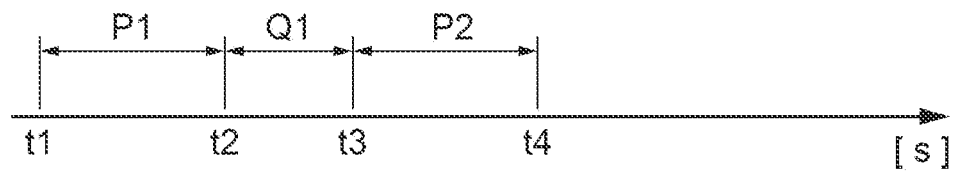
FIG. 7 is a diagram for explanation of an example of display timing of respective images.

As shown in FIG. 7, the control section 43 controls the display device 30 to display the first content image 21 selected from the plurality of content images on the screen C from time t1 to time t2. The control section 93 controls the display device 30 to display the first pattern image Q1 determined by the pattern image determination section 42 on the screen C from time t2 to time t3 after the first content image P1. The control section 43 controls the display device 30 to display the second content image P2 on the screen C from time t3 to time t4 after the first pattern image Q1. In other words, there is no interval in which another image is displayed on the screen C after the first content image P1 is displayed and before the first pattern image Q1 is displayed. That is, the first pattern image Q1 is displayed continuously from the first content image P1 on the screen C.

For example, the control section 43 inserts a display time of the first pattern image Q1 into the time series of the content not to change the display times in the time series of the content from an original. In this case, the control section 43 may replace part of the display time of at least one image of the first content image P1 and the second content image P2 by the display time of the first pattern image Q1. Note that, strictly, for example, the time t2 referring to the time at which the period for display of the first content image P1 ends indicates the time immediately before the time t2 when the display of the first pattern image Q1 is started. The same applies to the other periods.

The first pattern image Q1 having the first color scheme determined based on the first color information of the first content image P1 is displayed immediately after the first content image P1, and thereby, the difference in color scheme between the first content image P1 and the first pattern image Q1 is reduced. Therefore, according to the display control device 20, flickering sensed by the user because of the difference between the first content image P1 and the first pattern image Q1 may be relieved.

Further, the first color scheme of the first pattern image Q1 may be determined based on the first color information of the first content image P1 and second color information of the second content image P2. For example, the pattern image determination section 42 may determine the first color scheme from the respective representative values of the selected pixels of the first content image P1 and the selected pixels of the second content image P2. Thereby, the display control device 20 may respectively reduce the difference in color scheme between the first content image P1 and the first pattern image Q1 and the difference in color scheme between the first pattern image Q1 and the second content image P2.

Figure 8:
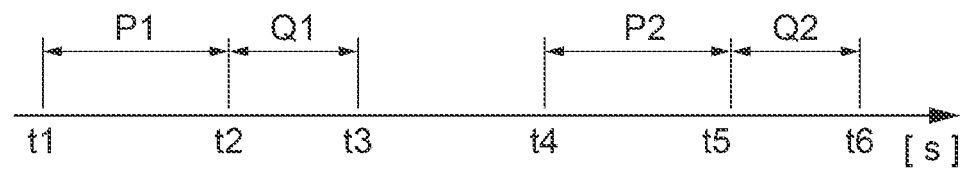
FIG. 8 is a diagram for explanation of another example of display timing of respective images.

Or, as shown in FIG. 8, the control section 43 may display the second content image P2 at an interval from the end of the display of the first pattern image Q1 not immediately after the first pattern image Q1. In the example shown in FIG. 8, the first content image P1 is displayed from time t1 to time t2 and the first pattern image Q1 is displayed from time t2 to time t3. Then, the second content image P2 is displayed from time t4 to time t5. In other words, the first pattern image Q1 is displayed continuously from the first content image P1 on the screen C.

Further, the control section 43 may control the display, device 30 to d splay a second pattern image Q2 determined by the pattern image determination section 42 after the second content image P2 on the screen C from time t5 to time t6. In other words, the second pattern image Q2 is displayed continuously from the second content image P2 on the screen C.

In this case, the pattern image determination section 42 determines the second pattern image Q2 having a second color scheme based on the second color information of the second content image P2 in advance. The second pattern image Q2 may be determined by the same method as the method of determining the first pattern image Q1. For example, the pattern image determination section 42 selects the pattern image having the second color scheme closest to the second content image P2 from the data of the plurality of pattern images stored in the memory unit 21 and determines the image as the second pattern image Q2.

The second pattern image Q2 having the second color scheme determined based on the second color information of the second content image P2 is displayed immediately after the second content image P2, and thereby, the difference in color scheme between the second content image P2 and the second pattern image Q2 is reduced. In this case, according to the display control device 20, flickering sensed by the user because of the difference between the second content image P2 and the second pattern image Q2 may be relieved.

Figure 9:
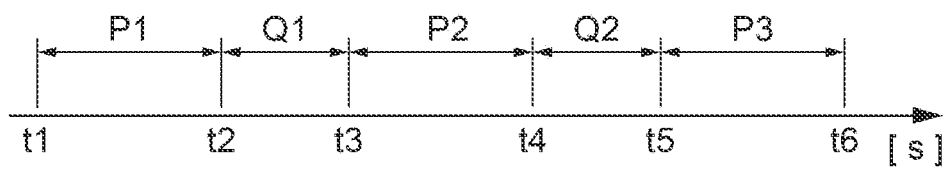
FIG. 9 is a diagram for explanation of another example of display timing of respective images.

Or, as shown in FIG. 9, the control section. 43 may continuously display the first content image P1, the first pattern image Q1, and the second content image P2, and then, subsequently display the second pattern image Q2 like the example shown in FIG. 7. In the example shown in FIG. 9, the first pattern image Q1 is displayed from time t2 to time t3, and the second content image P2 is displayed from time ft to time t4. In other words, the first pattern image Q1 is displayed continuously from the first content image P1 on the screen C. The second pattern image Q2 is displayed from time t4 to time t5 immediately after the second content image P2. In other words, the second pattern image Q2 is displayed continuously from the second content image P2 on the screen C.

Further, the second color scheme of the second content image P2 may be determined based on the second color information of the second content image P2 and third color information of a third content image P3. The third content image P3 is displayed from time t5 to time t6 immediately after the second pattern image Q2. For example, the pattern image determination section 42 may determine the second color scheme to minimize the difference in color scheme between the second content image P2 and the second pattern image Q2 and the difference in color scheme between the second pattern image Q2 and the third content image P3.

According to the control by the display control device 20, the image sensor 12 generates the detection image by imaging the pattern image displayed on the screen C. For example, from time t2 to time t3 in the example shown in FIG. 7, the image sensor 12 generates the detection image of the first pattern image Q1 by imaging the first pattern image Q1 displayed on the screen C. The object detection section 44 detects a projection object forming the screen C from the detection image. For example, the object detection section 44 calculates the position of the projection object in a three-dimensional space with reference to the display apparatus 10. Thereby, the object detection section 44 may detect a distance to the projection object, an inclination of an optical axis of the optical system 33 relative to the projection object, etc.

The calibration processing section 45 calibrates the image D displayed on the screen C using the detection image generated by the image sensor 12. For example, the calibration processing section 45 calibrates the image D using an autofocus function of adjusting the focal length of the optical system 33 based on the position of the projection object detected by the object detection section 44 and the settings of the optical system 33 detected by the detector 14. Further, the calibration processing section 45 corrects distortion in the screen C by executing two-dimensional coordinate transform on the image D based on the position of the projection object and the settings of the optical system 33. As described above, the display control device 20 may calibrate the content image displayed on the screen C using the detection image while relieving flickering sensed by the user.

Figure 10:
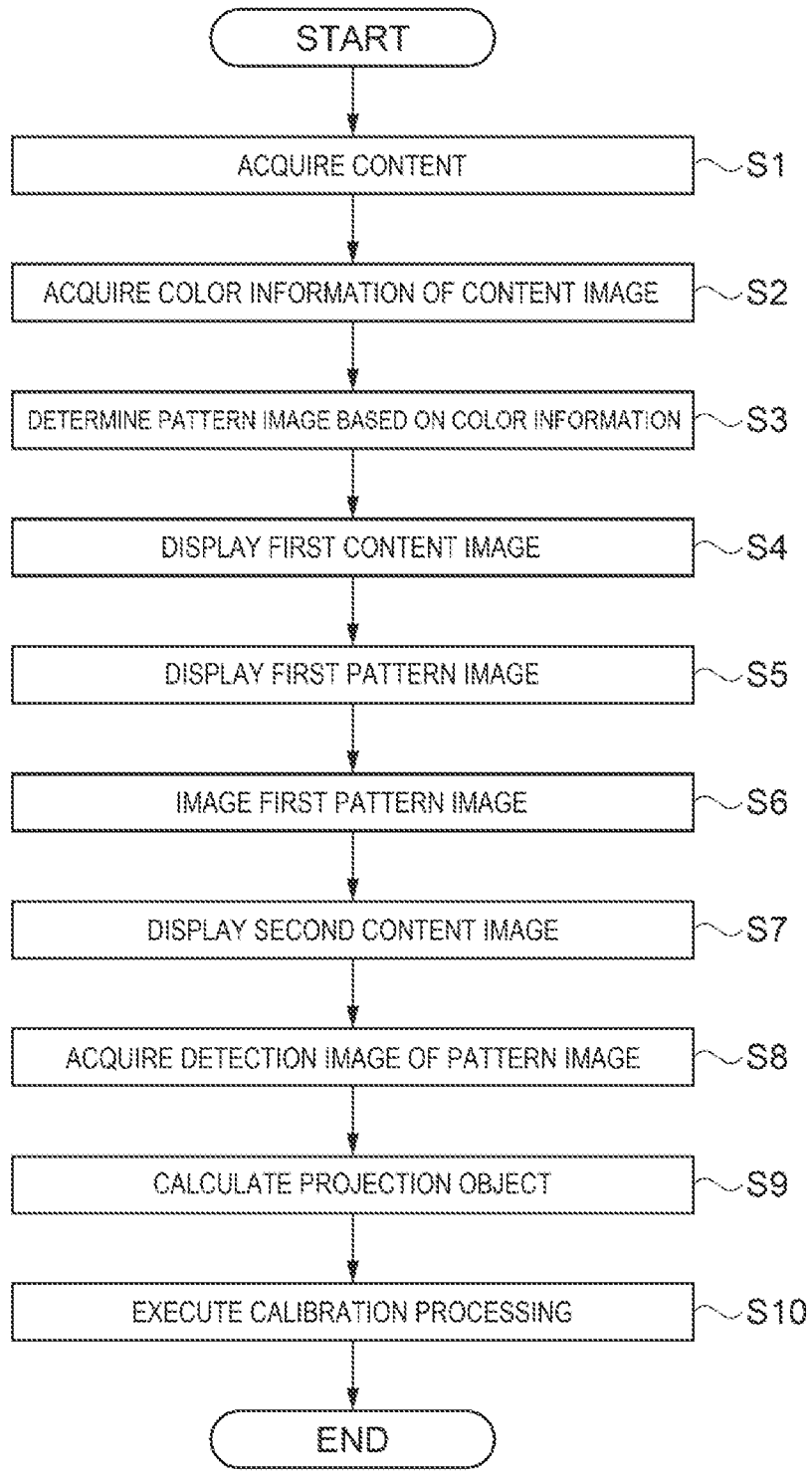
FIG. 10 is a diagram for explanation of a display control method according to an embodiment.

As below, referring to a flowchart in FIG. 10, as a display control method by the display system 1, an example of a series of processing executed in the display apparatus 10 will be explained.

At step S1, the content acquisition section 41 acquires the content input from the reproducing apparatus 50 via e.g. the input I/F 11. The content acquisition section 41 acquires the data of the plurality of time-series content images including the first content image P1 and the second content image P2 by multiply separating and decoding data of sequential content.

At step S2, the pattern image determination section 42 acquires the first color information by analyzing the first content image P1 acquired at step S1. The pattern image determination section 42 acquires the representative values of the respective colors of the plurality of selected pixels of the first content image P1 as the first color information. The pattern image determination section 42 may divide the selected pixels into a plurality of groups and acquires the color schemes obtained from the representative values of the respective groups as the first color information.

At step S3, the pattern image determination section 42 determines the first pattern image Q1 based on the first color information acquired at step S2. For example, the pattern image determination section 42 refers to the plurality of pattern images stored in the memory unit 21, selects the pattern image having the minimum color difference from the first color information, and determines the pattern image as the first pattern image Q1.

At step S4, the control section 43 controls the display device 30 to display the first content image 21 on the screen C. At step S5, the control section 43 controls the display device 30 to display the first pattern image Q1 on the screen C continuously from the first content image 21 displayed at step S4.

At step S6, the image sensor 12 generates the detection image of the first pattern image Q1 by imaging the first pattern image Q1 displayed at step S5. At step S7, for example, the control section 43 controls the display device 30 to display the second content image P2 continuously from the first pattern image Q1 displayed at step S5.

At step S8, the object detection section 44 acquires the detection image generated at step S6 from the image sensor 12. At step S9, the object detection section 44 calculates the position of the projection object in the three-dimensional space with reference to the display apparatus 10. At step S10, the calibration processing section 45 executes calibration processing including autofocus and distortion correction using the position of the projection object calculated at step S9.

The display and the calibration processing of the pattern image may be started in response to e.g. the operation by the user on the input device 13, or may be started in response to that a predetermined parameter calculated from an image imaged by the image sensor 12 exceeds a threshold value by monitoring of the image.

As described above, according to the display system 1 of the embodiment, the first pattern image Q1 determined based on the first color information of the first content image P1 is displayed after the first content image P1. Thereby, the display system 1 may suppress an increase of the difference in color scheme between the first content image P1 and the first pattern image Q1. That is, the display system 1 may relieve flickering sensed by the user because of the difference in color scheme between the first content image P1 and the first pattern image Q1.

The embodiments are described as above, and the present disclosure is not limited to the disclosure of the embodiments. The configurations of the respective parts may be replaced by arbitrary configuration having the same functions, or arbitrary configurations in the respective embodiments may be omitted or added within the technical scope of the present disclosure. From the disclosure of the embodiments, various alternative embodiments will be clear to those skilled in the art.

Figure 11:
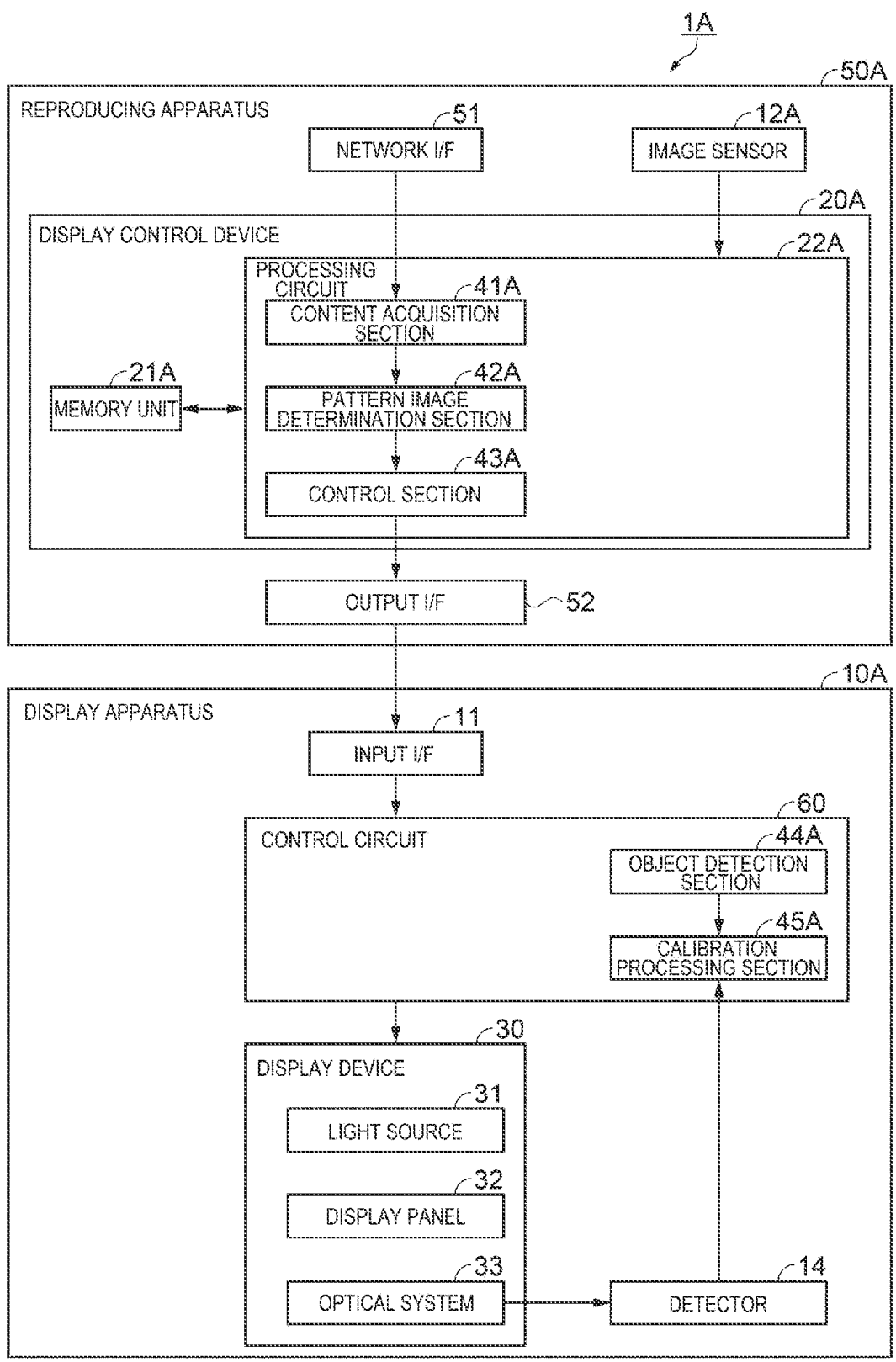
FIG. 11 is a block diagram for explanation of a display system according to a modified example of the embodiment.

For example, in the above described embodiments, at least part of the functions of the display control device 20 may be realized outside of the display apparatus 10. As shown in FIG. 11, a display system according to a modified example of the embodiment includes a reproducing apparatus 50A having a display control device 20A and a display apparatus 10A. The reproducing apparatus 50A includes e.g. a network I/F 51, an image sensor 12A, and an output I/F 52 in addition to the display control device 20A. The network I/F 51 connects to another network such as the Internet via a communication link. The communication link may be wired or wireless. For example, the network I/F 51 receives streaming information representing contents from a server providing contents distribution service on the other network and outputs the information to the display control device 20A.

The display control device 20A includes a memory unit 21A that stores a plurality of pattern images respectively having color schemes different from one another and a processing circuit 22A having a content acquisition section 41A, a pattern image determination section 42A, and a control section 43A. The content acquisition section 41A acquires content containing a plurality of time-series content images via the network I/F 51. The pattern image determination section 42A acquires the first color information by analyzing the first content image P1 contained in the content. The pattern image determination section 42A determines the first pattern image Q1 from the plurality of pattern images stored in the memory unit 21A based on the first color information.

The control section 43A generates time-series image data for displaying the first content image P1, displaying the first pattern image Q1 immediately after the first content image P1, and displaying the second content image P2 immediately after the first pattern image Q1. The output I/F 52 sequentially outputs the image data generated by the control section 43A to the display apparatus 10A.

The display apparatus 10A includes a control circuit 60 having an object detection section 44A and a calibration processing section 45A. The control circuit 60 generates image signals based on the image data input from the reproducing apparatus 50A via the input I/F 11, and sequentially outputs the image signals to the display device 30. Thereby, the control circuit 60 controls the display device 30 to sequentially display the first content image P1, the first pattern image Q1, and the second content image P2 on the screen C.

Further, the reproducing apparatus 50A may generate the detection image by imaging the first pattern image Q1 displayed on the screen C using the image sensor 12A. The object detection section 44A calculates the position of the projection object forming the screen C based on the detection image generated by the image sensor 12A. The calibration processing section 45A may execute various kinds of calibration processing on the image D based on the position of the projection object detected by the object detection section 44A and the settings of the optical system 33 detected by the detector 14. Note that the functions of the object detection section 44A and the calibration processing section 45A may be realized by the processing circuit 22A of the reproducing apparatus 50A.

The content image is not necessarily a content acquired from outside. For example, computer graphics generated by the processing circuit 22A according to the control program may be employed as the content image. Thereby, for example, during display of a menu window, a pattern image determined based on color information of the menu window can be displayed.

The pattern image is not necessarily stored in the memory unit 21 in advance. For example, the pattern image determination section 42 may generate a pattern image by determining a color scheme having the minimum difference from the color scheme of the content image for a predetermined pattern. Further, the use of the pattern image is not limited to the calibration of the image D. For example, in a picture having two continuous frames with a large color change, the two frames may be handled as the first content image P1 and the second content image P2. A pattern image having a color scheme to reduce the gradient of the color change between the two frames is determined and displayed between the two frames, and thereby, flickering sensed by the user may be relieved and a load on the eyes of the user may be relieved.

It is obvious that the present disclosure includes various other embodiments including configurations formed by application of the above described respective configurations to one another. The technical scope of the present disclosure is defined only by the matters used to specify the present disclosure according to the appended claims appropriate from the above described explanation.

What is claimed is:

1. A display control device that controls a display device displaying an image on a screen, comprising:
one or more processors programmed to:
acquire a first content image and a second content image;
determine a first pattern image having a first color scheme based on first color information;
control the display device to display the first content image on the screen, display the first pattern image on the screen after displaying the first content image, and display the second content image on the screen after displaying the first pattern image;
generate a detection image by imaging the first pattern image displayed on the screen using an image sensor; and
calibrate an image displayed on the screen using the detection image, wherein
the first content image has the first color information,
the first content image to the first pattern image to the second content image are displayed continuously with no intervals between the images, and
the second content image has second color information,
and the one or more processors are further programmed to control the display device to display a second pattern image having a second color scheme determined based on the second color information on the screen after the displaying the second content image, and
wherein the first color scheme is determined based on the first color information of the first content image and second color information of the second content image, to respectively reduce the difference in color scheme between the first content image and the first pattern image and the difference in color scheme between the first pattern image and the second content image.

2. A display system comprising:
a display device that displays an image on a screen; and
a display control device includes:
one or more processors programmed to:
acquire a first content image and a second content image;
determine a first pattern image having a first color scheme based on first color information;
control the display device to display the first content image on the screen, display the first pattern image on the screen after displaying the first content image, and display the second content image on the screen after displaying the first pattern image;
generate a detection image by imaging the first pattern image displayed on the screen using an image sensor; and
calibrate an image displayed on the screen using the detection image, wherein
the first content image has the first color information, and
the first content image to the first pattern image to the second content image are displayed continuously with no intervals between the images,
the second content image has second color information,
and the one or more processors are further programmed to control the display device to display a second pattern image having a second color scheme determined based on the second color information on the screen after the displaying the second content image, and
wherein the first color scheme is determined based on the first color information of the first content image and second color information of the second content image, to respectively reduce the difference in color scheme between the first content image and the first pattern image and the difference in color scheme between the first pattern image and the second content image.

3. The display system according to claim 2, wherein the display control device acquires the first color information by analyzing the first content image.

4. A display control method comprising:
acquiring a first content image and a second content image;
determining a first pattern image having a first color scheme;
displaying the first content image on a screen;
displaying the first pattern image on the screen after the displaying the first content image;
displaying the second content image on the screen after the displaying the first pattern image; and displaying a second pattern image having a second color scheme determined based on second color information on the screen after the displaying the second content image, wherein the first content image has the first color information, the second content image has the second color information, the first content image to the first pattern image to the second content image are displayed continuously with no intervals between the images, and the first color scheme is determined based on the first color information of the first content image and second color information of the second content image, to respectively reduce the difference in color scheme between the first content image and the first pattern image and the difference in color scheme between the first pattern image and the second content image.

5. The display control method according to claim 4, wherein
a color contained in the first color scheme is in a same series as a color represented by the first color information.

6. The display control method according to claim 4, further comprising acquiring the first color information by analyzing the first content image.

7. The display control method according to claim 6, wherein
the first color information is acquired from respective colors of a plurality of pixels selected from the first content image.

8. The display control method according to claim 4, further comprising:
storing a plurality of pattern images containing the first pattern image; and
selecting the first pattern image from the plurality of pattern images based on the first color information.

* * * * *